(12) United States Patent
Engberg et al.

(10) Patent No.: US 6,418,265 B1
(45) Date of Patent: Jul. 9, 2002

(54) LIMITED SPACE HANDLING OF OPTICAL FIBERS

(75) Inventors: Kristian Engberg, Sollentuna; Stefan Hansson, Sundbyberg; Thomas Hanspers, Stockholm, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/580,174

(22) Filed: May 26, 2000

(30) Foreign Application Priority Data

May 27, 1999 (SE) ................................. 9901925

(51) Int. Cl.[7] ................................. G02B 6/00
(52) U.S. Cl. ........................................ 385/135
(58) Field of Search ..................... 385/135, 138, 385/139

(56) References Cited

U.S. PATENT DOCUMENTS

| | | | |
|---|---|---|---|
| 4,428,645 A | 1/1984 | Korbelak et al. | 385/135 |
| 5,119,459 A | 6/1992 | Meyerhoefer et al. | 385/135 |
| 5,224,199 A | 6/1993 | Cortijo | 385/135 |
| 5,313,546 A | 5/1994 | Toffetti | 385/135 |
| 5,598,499 A | * 1/1997 | Burek et al. | 385/138 |

FOREIGN PATENT DOCUMENTS

WO 97/41474 11/1997 ............ G02B/6/44

* cited by examiner

*Primary Examiner*—Tulsidas Patel
(74) *Attorney, Agent, or Firm*—Burns, Doane, Swecker & Mathis, L.L.P.

(57) ABSTRACT

The present invention relates to an arrangement for handling optical fibers in a confined space, such as connecting, reorganizing and/or cross-connecting several optical fibers contained in optical fiber cables in an insulated space. Controllable organization of the optical fiber cables can be achieved, by providing the insulated space (2, 3) with cable guiding and coiling means. The arrangement includes elastic and tight transits in openings (5, 6). The transits have a tapering centre part and will adapt to optical fiber cables of mutually different diameters and allow the cables to extend in different directions outside the insulated space.

13 Claims, 5 Drawing Sheets

LIMITED SPACE HANDLING OF OPTICAL FIBERS

This application claims priority under 35 U.S.C. §§119 and/or to 9901925-9 filed in Sweden on May 27, 1999; the entire content of which is hereby incorporated by reference.

FIELD OF INVENTION

The present invention relates to an arrangement for reorganising and/or connecting optical fibres in a limited or confined space. When handling optical fibres, and then particularly optical fibres included in optical fibre cables, it is necessary to be able to combine several optical fibre cables at a collecting point and there reorganise and/or connect together individual optical fibres in a sealed fashion.

DESCRIPTION OF THE BACKGROUND ART

It is known to bring several optical fibre cables together in a closed container for reorganising and/or connecting the fibres. Commercially available solutions for sealing the cable transits or lead-throughs of the container include sealing said transits with the aid of shrink hoses placed on the optical fibre cables, or sealing said transits with the aid of self-vulcanising tape wound on the optical fibre cables, said tape being wound around the cable to an appropriate size. One disadvantage with the use of shrink hoses lies in the primary requirement of heat. The hoses must either be heated electrically or with the aid of gas. The former often requires the provision of a power source at the place where the cables are to be connected, while the latter constitutes an explosion hazard. The drawback with self-vulcanising tape is that installation is operator-dependent and that addition material is often required when resealing a used container, such as a connecting box.

U.S. Pat. No. 5,224,199A teaches a connecting box intended for optical fibre cables and comprising a bottom part and a top part which can be joined to the bottom part, wherein the bottom part and the top part each include grooves which face one another and when said parts are joined one to the other define channels into which elastic plugs that carry optical fibre cables are inserted. The elastic plugs are slotted, so as to facilitate both fitting and removal of the cables and enable the elastic plugs to be first placed on the optical fibre cables, so that the top part of the box can be connected to its bottom part with the plugs carrying said cables placed in the channels between the box parts. Dismantling of the cable from the box is effected by first separating the top part of the box from its bottom part and then opening the plugs, which is easily done, and removing the plugs from the cables and therewith release the same.

U.S. Pat. No. 5,313,546 teaches the use of an hermetically sealed connection encapsulation intended for optical fibre cables and comprising a bottom part which includes seal-accommodating channels and a lid which is connectable to said bottom part, wherein the seals include holes for accommodating optical fibre cables inserted thereinto. The seals of this solution have also been slotted to facilitate insertion of the cables into the seals prior to fitting the seals into the channels in the bottom part of the encapsulation.

SUMMARY OF THE INVENTION

With the intention of facilitating handling of optical fibre cables in a limited or confined space, such as a closed space, for instance in a sealed fibre/cable connecting box arrangement for reorganising and/or connecting optical fibres in said cables, the closed space has been provided with means for guiding and coiling the cables prior to stripping respective cables and mutually separating the optical fibres enclosed therein. In addition to organising the cables in said space in an ordered and controllable fashion, the provision of means for guiding and coiling the cables in said confined space also ensures that essentially the same preparation lengths are obtained with respect to the different cables, regardless of the transit or lead through which they have been inserted into said space, while also enabling the bending radii of the optical fibre cables to be monitored. By providing the elastic transits, i.e. the cable seals between the cables and the closed space, such as a cable connecting box, to the closed space accommodating the optical fibre cables with a tapering opening, alignment of the optical fibre cables can be adapted with respect to coiling of the cables, therewith reducing the influence of the transit on said cables. The centre part of the tapering opening enables the optical fibre cable to be angled to some extent when placed in the transit without needing to influence the tightness of the transit against the cable and against said space. The taper in the centre part of the transit also enables cables of different diameters to be sealed effectively. The cable seals will preferably seal the incoming and outgoing cables against the ingress of moisture and water.

The object of the invention is to integrate an optical fibre handling function in the moulded bottom part of a cable connecting box in all essential aspects. The purpose of this function is to provide a unitary measurement for all optical fibre cable preparations on the one hand, and to hold an installed optical cable in position in the bottom part of the box and prevent uncontrolled bending of the cables and to seal the cable transits on the other hand.

The invention will now be described in more detail with reference to preferred embodiments thereof and also with reference to the accompanying drawings.

DESCRIPTION OF PREFERRED EMBODIMENTS

Figure 1:
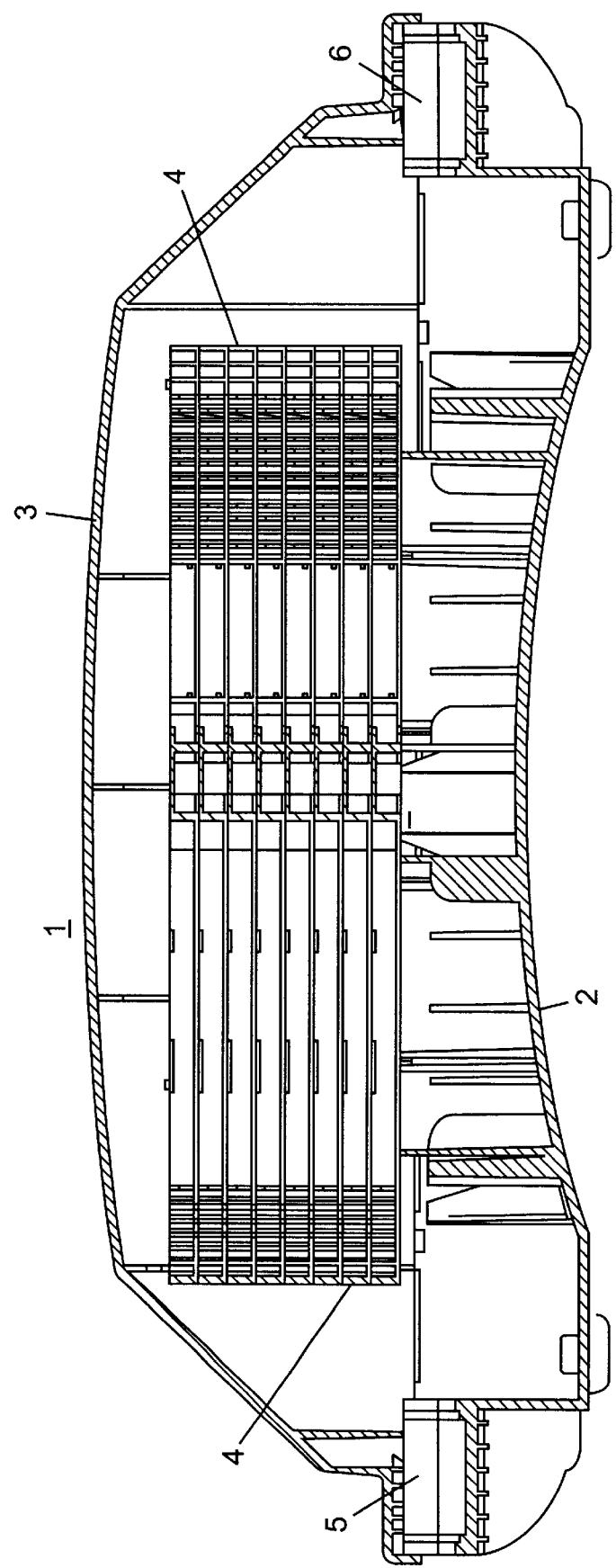
FIG. 1 illustrates a connecting box arrangement for optical fibre cables arranged in accordance with the invention.

FIG. 1 illustrates an openable cable connecting box arrangement 1 according to the invention, which includes a bottom part 2, a top part 3 and several optical fibre cassettes 4 for organising and coiling the optical fibres. The box arrangement can be connected with optical fibre cables that are sealed by cable seals, by inserting the cables through openings 5, 6 at respective ends of the connecting box. The bottom part of the box can be joined to its top part with the aid of locking or latching means for instance, so as to obtain an easily opened connecting box arrangement. In order to provide a positive and tight connection of the optical fibre cables, the ends of the top and bottom parts of the box may be provided with mutually coacting and openable nut and bolt joints and a sealing device, such as an O-ring, may be placed between the respective mutually facing connecting surfaces of the top and bottom parts of the box. The bottom part of the box includes a space which accommodates means for guiding and coiling incoming and outgoing optical fibre cables. When the top part 3 of the box is given an appropriate height, several optical fibre cassettes 4 can be stacked on the lower part and accommodated in said top part. One or more openings for sealed transit of the optical fibre cables may be provided on each side of the ends of the bottom part of the box. The top and bottom parts of the connecting box arrangement will preferably be made of a plastic material, such as polycarbonate, polyphenyl oxide, polybutiene terephthalate, polypropylene or the like.

Figure 2:
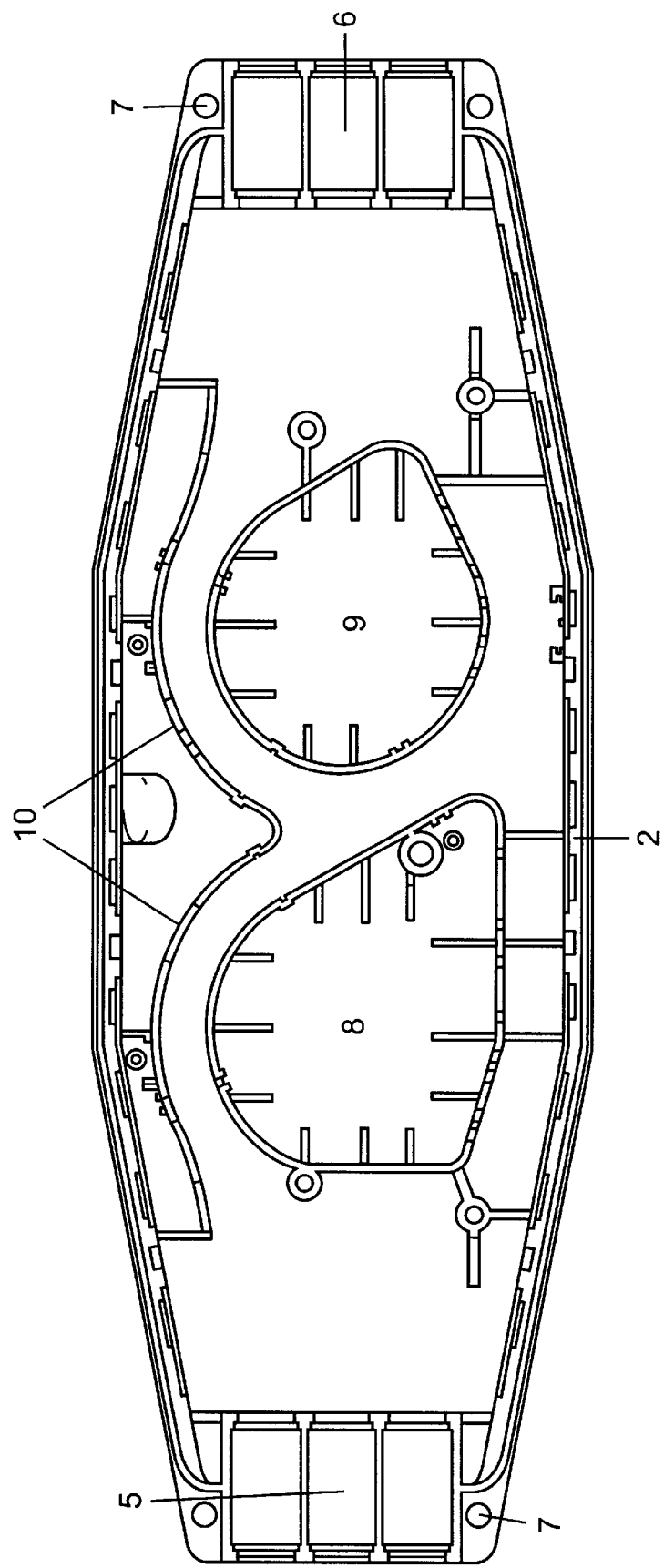
FIG. 2 shows a bottom part of the box arrangement of FIG. 1 from above.

FIG. 2 shows the bottom part 2 of the box arrangement from above. Both short sides of the lower box part 2 include openings 5, 6, such as apertures, for insertion of optical fibre cables into cable seals. The illustrated openings have smooth sides and a semi-cylindrical bottom so as to conform fully with the cross-sectional shape of the cable seals, therewith enabling the cable transits to be made completely tight. Provided at the ends of the bottom part are holes 7 for receiving screws or the like fasteners for fixing the top part 3 to the bottom part 2 and for clamping intermediate cable seals enclosing optic fibre cables to prevent the ingress of moisture into the interior space of the connecting box arrangement. Arranged in the central portion of the bottom part of the box are two cable coiling and guiding devices 8, 9 which function to coil or wind the incoming and outgoing cables. An undulating guide element 10 is provided on one side of the inside of the bottom part of the box arrangement. The arrangement also includes various holes for receiving screws or like fasteners for securing devices that hold the cassettes 4 disposed on the bottom part 2 of the box interior.

Figure 3A:
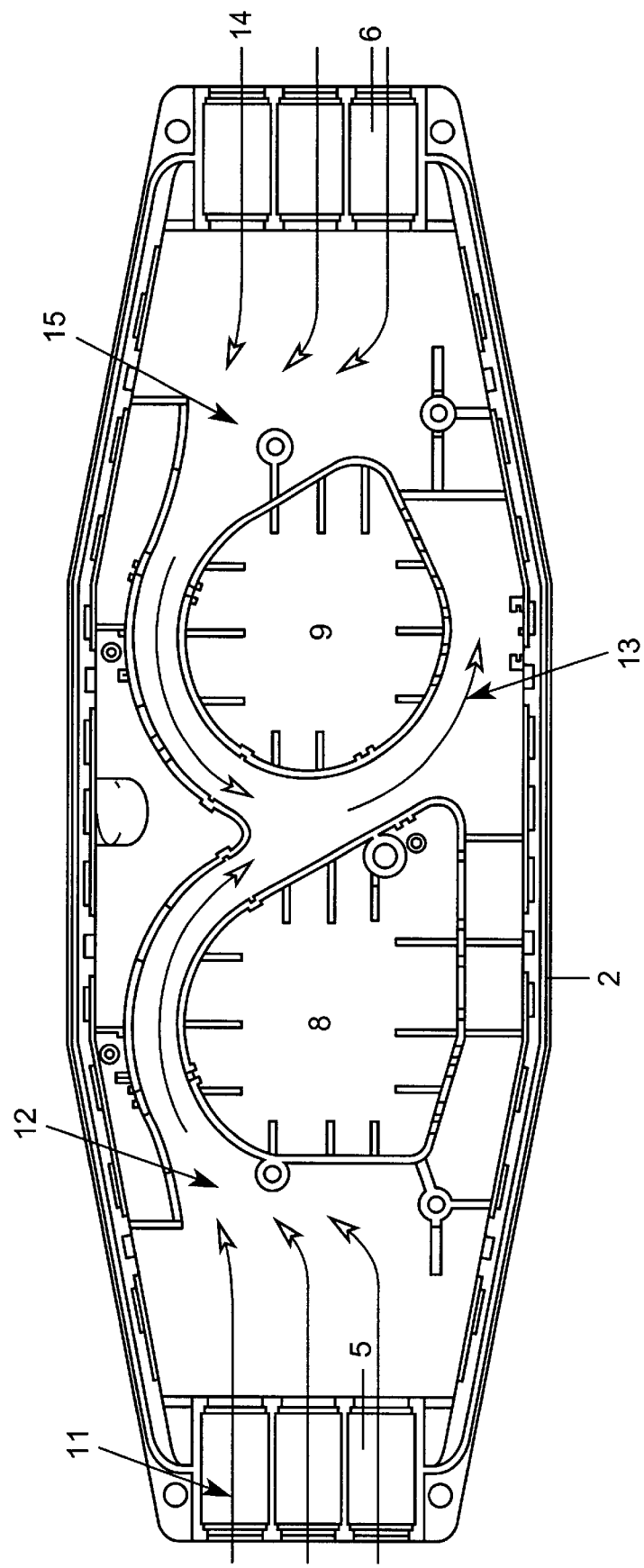
FIG. 3A illustrates with the aid of arrows the directions in which incoming and outgoing optical fibre cables are inserted into the bottom part of the box shown in FIG. 2 for correct placement of the fibres/cables in the guide grooves in said bottom part.

FIG. 3A shows with arrows in the bottom part of the box the insertion directions of the optical fibre cables and optical fibres. As shown at 11, the incoming cables containing optical fibres are passed into the bottom part of the box arrangement through the openings 5, 6 and are first guided towards a channel 12 and over the first coiling device 8 and then beneath the second coiling device 9 and then to overlying tray/cassettes for accommodating optical fibres or for further coiling of the cable around the second coiling device. The coiling devices 8, 9 enable individual cables to be coiled for storage in the box arrangement, or for obtaining lengths of optical fibre cable which are equivalent to the length of the optical transport paths in an optical fibre system. As shown at 14, the optical fibres of the outgoing optical fibre cables are passed into the bottom part of the box arrangement and first guided up towards the channel 15 and over the second coiling device 9, and from there up to the overlying trays/cassettes, for instance.

Figure 3B:
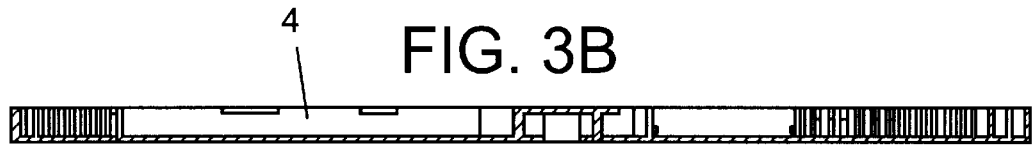
FIG. 3B illustrates from one side an optical fibre cassette in accordance with the present invention.
Figure 3C:
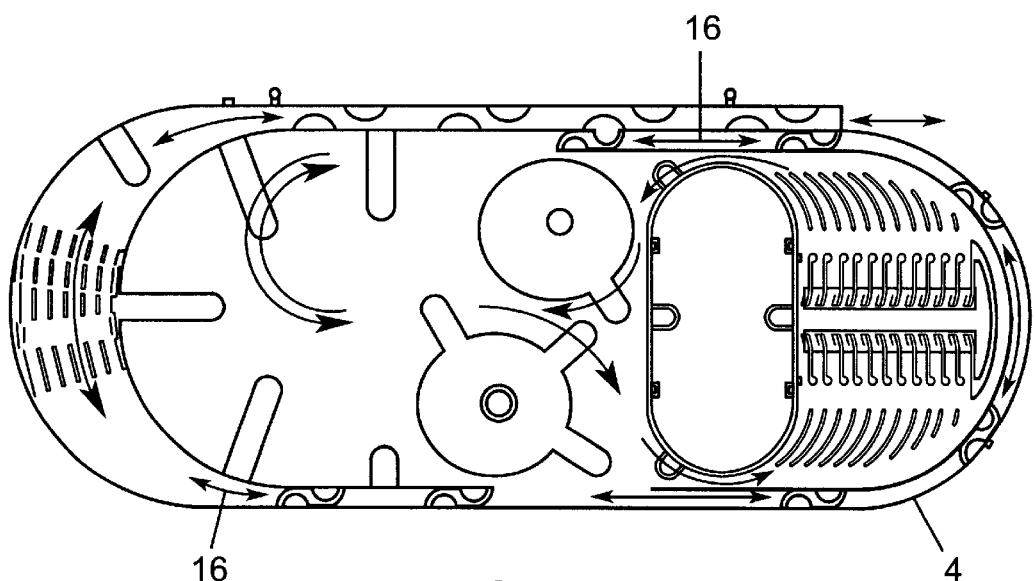
FIG. 3C illustrates from above an optical fibre cassette, and shows with the aid of arrows the directions in which the optical fibres are inserted for correct placement of the optical fibres/cables in said optical fibre cassette.

FIGS. 3B and 3C illustrate from one side and from above, respectively, a cassette 4 in which one or more optical fibres can be coiled/wound while leaving room for connecting and/or redirecting the optical fibres with the minimum of fibre intersection. The arrows 16 illustrate directions in which the optical fibre/optical fibres of the optical fibre cables is/are coiled.

Figure 4A:
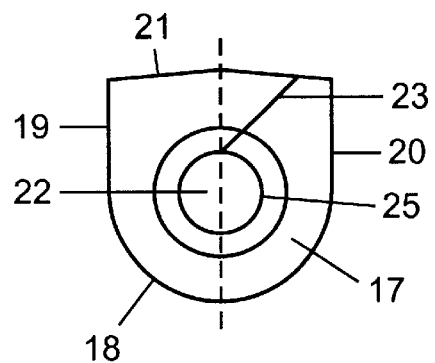
FIGS. 4A–D illustrate respectively an inventive elastic transit from one short side, from one long side, in cross-section and in perspective.

FIGS. 4A–D illustrate a cable seal from different directions and in cross-section. FIG. 4A is a view of the cable seal 17 from one short side thereof and shows the seal to include a semi-cylindrical underside 18 and flat longitudinal sides 19, 20. The upper side 21 has a high centre part and low side edges. Consequently, when the cable seal 17 is in place in an opening 5, 6, it will be pressed down more in its centre than at its sides when securing the top part 3 of the box arrangement to its bottom part 2, therewith improving clamping, and also sealing, of the cable transit that leads into the interior of the box arrangement 1. As will be seen from FIG. 4, the cable seal includes a centre hole 22 through which the optical fibre cable can be passed and the conical shape of which has been reproduced in the figure by means two closely adjacent and concentrical circles. The tapering shape/conicity of the cable seal enables the seal to be adapted to cables of different diameters and permits a cable passing through the cable seal to be angled without being broken and while maintaining an effective seal. The possibility of angling the cable is beneficial when the cable shall be guided to one or the other side externally of the box arrangement, after having passed the cable through the cable seal. The slot is preferably made oblique, so as to provide greater tightness as it encloses an optical fibre cable in the channel on the bottom part of the box arrangement.

Figure 4B:
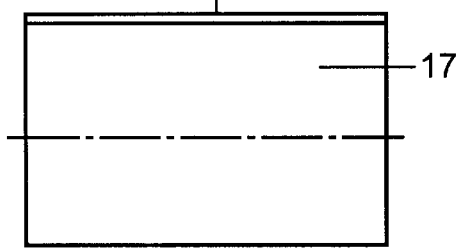

FIG. 4B is a side view of the cable seal 17. It will be seen that the cable seal is long in relation to its width, which provides effective guidance of a cable passing therethrough and also stable fixation of the cable even when it is necessary to angle the cable in towards the box arrangement. The elevated centre part of the cable seal is shown at 24.

Figure 4C:
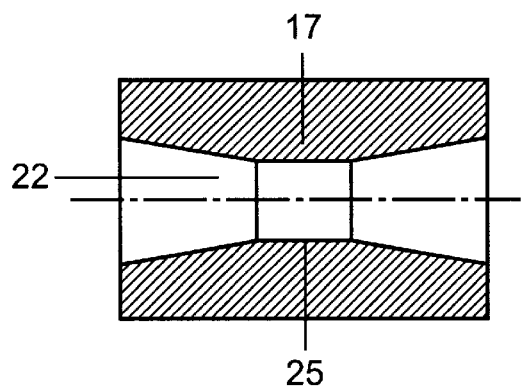

FIG. 4C is a cross-sectional view of the cable seal 17 and shows the hole 22 tapering towards a circular-cylindrical opening 25.

Figure 4D:
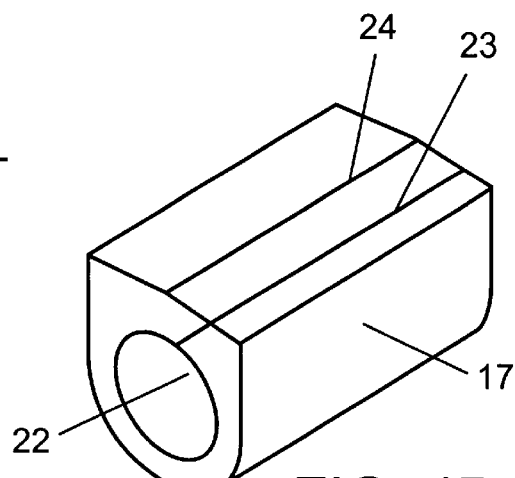
Figure 5:
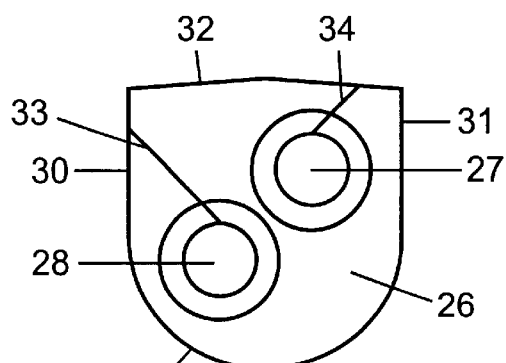
FIG. 5 illustrates from one short side an elastic transit that includes several holes.

FIG. 4D is a perspective view of the cable seal 17 and shows the longitudinal slot 23 and the elevated centre part 24 of said seal. FIG. 5 illustrates a cable seal 26 that includes several holes 27, 28, seen from one short side of the seal. The cable seal has a semi-cylindrical underside 29 and flat longitudinal sides 30, 31. The upper side 32 has a high centre part and lower side edges, which, when the cable seal is in place in an opening 5, 6, cause the cable seal to be pressed down more in its centre region than at the sides thereof as the top part of the box is tightened against the bottom part thereof, therewith improving clamping, and also sealing, of the optical fibre cables passing through said seal and into the interior of the box arrangement 1. The conical shape of the holes 27, 28 have been illustrated in the figure by means of two mutually adjacent and concentrical circles. Openable slots 33, 34 have been provided obliquely in the upper part of the cable seal and on one side thereof, for insertion of the optical fibre cables into the cable seal.

Figure 6:
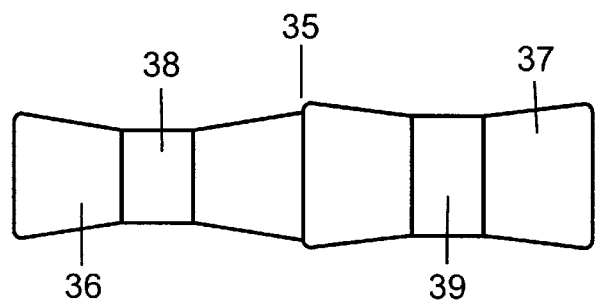
FIG. 6 illustrates a plug for sealing an opening in a transit, in accordance with the invention.

FIG. 6 illustrates a connecting device 35 for an unused cable transit comprising two combined plugs 36, 37 which are operative in closing two different hole diameters in a sealing cable transit. Because respective plugs have been given a tapering centre part 38, 39 adapted to the shape of the hole in the transit, the hole will be closed positively and sealingly after the plug has been inserted into the hole in the cable transit. In the event of pressure differences between the interior space and the surroundings, the configuration of the plug and the hole will coact to keep the plug in the hole. The plugs may be used conveniently for closing the connecting box arrangements during their transportation prior to use.

It will be understood that the invention is not restricted to the aforedescribed and illustrated embodiments thereof and that modifications can be made within the scope of the accompanying Claims.

What is claimed is:

1. An arrangement for handling optical fibers in a confined space contained in optical fiber cables in an insulated space, wherein the insulated space comprises at least one under part and at least one upper part, in that means are provided between the under part and the upper part for sealing, in that means for sealing comprises at least one elastic tight transit for an optical fiber cable including an opening, at least one side of which is tapered, the transit being a sealing material between contact areas of the under and upper parts, in that at least one channel in said insulated space for guiding the optical fiber cable into said insulated space is provided with the elastic tight transit, wherein the transit can adaptively seal to encase optical fiber cables that have different diameters and that extend in different directions, and wherein an optical fiber cable extending through said transit can be angled at a permitted angle so as to allow the direction of the cable to be adapted outside said insulated space.

2. An arrangement according to claim 1, further comprising a plug/plugs for insertion into said opening/openings of said transits, said plug/plugs having a tapering center part which fits the cross-sectional shape of said opening or openings.

3. An arrangement according to claim 1, wherein said elastic transit has an elevated center part for better fastening of a cable, when inserted in the transit between the upper part and the lower part.

4. An arrangement according to claim 1, wherein the elastic transit comprises at least one tapered slot, that can be opened, wherein impenetrability ensues when compressing the transit.

5. A housing arrangement for handling optical fibers in a confined or limited insulated space comprising:
   at least one optical fiber cassette for reorganizing and/or cross-connecting optical fibers contained in the insulated space;
   an upper part;
   a lower part, wherein the upper part and the lower part of the housing are sealed together to form the insulated space; and
   at least one channel to guide the optical fiber cable into the insulated space, wherein the at least one channel contains an elastic transit, wherein the elastic transit comprises;
      at least one center opening having two outer edges and a middle through which at least one optical fiber cable passes through to the insulated space of the housing, wherein the at least one center opening tappers from the two outer edges to the middle such that the opening in the outer edges of the at least one center opening is larger than the opening in the middle of the at least one center opening, and wherein the at least one center opening adaptively seals to different cables of different sizes and allows the optical fiber cable to be angled to a permitted angle for guiding of the optical fiber cable, and
      an outer part, wherein when the upper and the lower part of the housing are sealed together the outer part of the elastic transit is adaptively sealed to the respective upper and lower part thereof, and wherein the outer part of the elastic transit is compressed toward the at least one center opening of the transit.

6. The housing arrangement of claim 5, wherein the outer part of the transit has at least one longitudinal elevated part, wherein when the upper and the lower part of the housing are sealed together the at least one longitudinal elevated part of the transit is pressed toward the at least one center opening of the transit thereby adaptively sealing and securing the at least one optical fiber cable passing through the at least one center opening of the transit.

7. The housing arrangement of claim 5, wherein the transit further comprises at least one slot extending from the outer part to the at least one center opening.

8. The housing arrangement of claim 7, wherein the at least one slot in the transit is oblique.

9. The housing arrangement of claim 5, wherein the outer part of the elastic transit is cylindrical in shape.

10. A housing arrangement for handling optical fibers in a confined or limited insulated space comprising:
    at least one optical fiber cassette for reorganizing and/or cross-connecting optical fibers contained in the insulated space;
    an upper part;
    a lower part, wherein the upper part and the lower part of the housing are sealed together to form the insulated space; and
    at least one elastic transit, inserted between the upper part and lower part, the at least one elastic transit comprising;
       at least one opening through which at least one optical fiber cable can pass through to the insulated part of the housing, wherein the opening tapers from two sides to fit optical fiber cables of different diameters, and
       an outer part, wherein when the upper and the lower part of the housing are sealed together the outer part of the elastic transit is adaptively sealed to the respective upper and lower part thereof, the outer part of the elastic transit comprising;
          a semi-cylindrical underside,
          two flat longitudinal sides,
          an upper side, wherein the upper side has a high longitudinal center part and longitudinal low side edges, thereby providing that when the at least one transit is adaptively sealed between the upper and lower part of the housing the transit will press down more in its center than at its low side edges to adaptively seal and secure the at least one optical fiber cable passing through the at least one opening of the transit.

11. The housing arrangement of claim 10, wherein the transit further comprises at least one slot extending from the outer part to the at least one opening.

12. The housing arrangement of claim 11, wherein the at least one slot in the transit is oblique.

13. The housing arrangement of claim 10, wherein the at least one opening of the transit is conical in shape from the two sides, and wherein outermost edges of the at least one opening are larger than a middle section of the at least one opening.

* * * * *